(12) United States Patent
Jones

(10) Patent No.: US 10,917,505 B2
(45) Date of Patent: Feb. 9, 2021

(54) COVER SHEET AND INCORPORATED LENS FOR A CAMERA OF AN ELECTRONIC DEVICE

(71) Applicant: Apple Inc., Cupertino, CA (US)

(72) Inventor: Christopher D. Jones, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/899,141

(22) Filed: Jun. 11, 2020

(65) Prior Publication Data

US 2020/0304616 A1 Sep. 24, 2020

Related U.S. Application Data

(63) Continuation of application No. 16/242,905, filed on Jan. 8, 2019, now Pat. No. 10,694,010.

(60) Provisional application No. 62/694,920, filed on Jul. 6, 2018.

(51) Int. Cl.
*H04N 5/225* (2006.01)
*H04M 1/02* (2006.01)
*G02B 13/00* (2006.01)

(52) U.S. Cl.
CPC ........ *H04M 1/0264* (2013.01); *G02B 13/001* (2013.01); *H04N 5/2252* (2013.01); *H04N 5/2253* (2013.01); *H04N 5/2257* (2013.01)

(58) Field of Classification Search
CPC .......................... H04N 5/2257; H04M 1/0264
USPC .................................................. 348/373, 374
See application file for complete search history.

(56) References Cited

U.S. PATENT DOCUMENTS

| 4,633,323 | A | 12/1986 | Haberkern et al. |
| 8,092,911 | B2 | 1/2012 | Sakoske et al. |
| 8,106,787 | B2 | 1/2012 | Nurmi |
| 8,576,561 | B2 | 11/2013 | Myers et al. |
| 8,681,113 | B1 | 3/2014 | Wu et al. |
| 8,771,532 | B2 | 7/2014 | Carlson et al. |
| 8,953,083 | B2 | 2/2015 | Hedge |
| 9,017,566 | B2 | 4/2015 | Lander et al. |
| 9,154,678 | B2 | 10/2015 | Kwong et al. |
| 9,239,594 | B2 | 1/2016 | Lee et al. |
| 9,240,498 | B2 | 1/2016 | Fujita et al. |

(Continued)

FOREIGN PATENT DOCUMENTS

| WO | WO2014/011328 | 1/2014 |
| WO | WO2014/012003 | 1/2014 |
| WO | WO2015/191949 | 12/2015 |

OTHER PUBLICATIONS

Author Unknown, "LG's Future Display Technology Will Blow You Away," Techno Source, https://www.youtube.com/watch?v=qIRjytgNuhM, 2 pages, May 2, 2017.

(Continued)

*Primary Examiner* — Anthony J Daniels
(74) *Attorney, Agent, or Firm* — Brownstein Hyatt Farber Schreck, LLP

(57) ABSTRACT

An electronic device includes a cover sheet having a feature that is configured to interface with a camera of the electronic device. The cover sheet has a contoured blind recess formed along an inner surface. The contoured blind recess is configured to receive at least a portion of a lens of a camera system. A contour of the contoured blind recess corresponds with a contour of the lens.

20 Claims, 15 Drawing Sheets

(56) References Cited

U.S. PATENT DOCUMENTS

| | | | |
|---|---|---|---|
| 9,262,002 | B2 | 2/2016 | Momeyer et al. |
| 9,377,603 | B1 | 6/2016 | Cheng et al. |
| 9,880,327 | B2 | 1/2018 | Park et al. |
| 9,938,186 | B2 | 4/2018 | Moll et al. |
| 9,961,337 | B2 | 5/2018 | Stroetmann |
| 10,013,020 | B2 | 7/2018 | Hong et al. |
| 10,043,052 | B2 | 8/2018 | Wickboldt et al. |
| 10,171,636 | B2 | 1/2019 | Yeo et al. |
| 10,298,824 | B2 | 5/2019 | Lee et al. |
| 2013/0235462 | A1 | 9/2013 | Haas |
| 2013/0273324 | A1 | 10/2013 | Moll et al. |
| 2014/0327643 | A1 | 11/2014 | Sun et al. |
| 2016/0224822 | A1* | 8/2016 | Hasegawa ............... C03C 3/087 |
| 2016/0357294 | A1* | 12/2016 | Ozeki .................... B32B 17/06 |
| 2017/0026553 | A1 | 1/2017 | Lee et al. |
| 2017/0276618 | A1 | 9/2017 | Takagi |
| 2017/0308234 | A1* | 10/2017 | Li ......................... G06F 1/1626 |
| 2018/0042131 | A1* | 2/2018 | Liu .......................... B32B 3/30 |
| 2018/0086662 | A1 | 3/2018 | Luzzato et al. |
| 2018/0091712 | A1* | 3/2018 | Lee ...................... G01J 3/0272 |
| 2018/0162768 | A1 | 6/2018 | Boek et al. |
| 2018/0282201 | A1 | 10/2018 | Hancock et al. |
| 2019/0230204 | A1 | 7/2019 | Zhang |
| 2019/0246018 | A1 | 8/2019 | Rho et al. |
| 2019/0331940 | A1 | 10/2019 | Poole et al. |
| 2020/0014780 | A1 | 1/2020 | Jones |
| 2020/0026327 | A1 | 1/2020 | Hendren et al. |
| 2020/0199020 | A1* | 6/2020 | Hatano ................... G09F 9/00 |

OTHER PUBLICATIONS

Ben-Yakar et al., "Femtosecond laser ablation properties of borosilicate glass," Journal of Applied Physics, vol. 96, No. 9, 8 pages, Nov. 1, 2004.

Hedayati et al., Antireflective Coatings: Conventional Stacking Layers and Ultrathin Plasmonic Metasurfaces, A Mini-Review, Materials, vol. 9, No. 497, 2016.

Qi et al., "Simple Approach to Wafer-Scale Self-Cleaning Antireflective Silicon Surfaces," American Chemical Society, State Key Laboratory of Supramolecular Structure and Materials, College of Chemistry, Jilin University, Changchun 130012, P.R. China, 2009.

Seth, Radhika, "A Fresh New Look at the Computer," https://www.yankodesign.com/2009/02/06/a-fresh-new-look-at-the-computer, 1 page, Feb. 6, 2009.

Tan et al., "Broadband antireflection film with moth-eye-like structure for flexible display applications," Optica, vol. 4, No. 7, pp. 678-683, Jul. 2017.

Wimmer, "Curve: Revisiting the Digital Desk," NordiCHI '10: Proceedings of the 6th Nordic Conference on Human-Computer Interaction: Extending Boundaries, https://doi.org/10.1145/1868914.1868977, http://www.mmi.ifi.lmu.de/pubdb/publications/pub/wimmer2010Curve/wimmer2010Curve.pdf, https://dl.acm.org/doi/10.1145/1868914.1868977, pp. 561-570, Oct. 2010.

* cited by examiner

COVER SHEET AND INCORPORATED LENS FOR A CAMERA OF AN ELECTRONIC DEVICE

CROSS-REFERENCE TO RELATED APPLICATION(S)

This application is a continuation patent application of U.S. patent application Ser. No. 16/242,905, filed Jan. 8, 2019 and titled "Cover Sheet and Incorporated Lens for a Camera of an Electronic Device," which is a nonprovisional patent application of and claims the benefit of U.S. Provisional Patent Application No. 62/694,920, filed Jul. 6, 2018 and titled "Cover Sheet and Incorporated Lens for a Camera of an Electronic Device," the disclosure of which is hereby incorporated by reference herein in its entirety.

FIELD

The described embodiments relate generally to electronic devices. More particularly, the described embodiments relate to a transparent cover that includes a recess that is configured to receive at least a portion of a camera of the electronic device.

BACKGROUND

In electronic devices, a camera may be employed to capture images. Many traditional electronic devices may enclose components of a camera behind exterior walls and other barriers that may limit a field of view of the camera. The thickness of the electronic device may be constrained by the thickness of the camera and the thickness of any exterior walls covering the camera, which may limit the thickness of the device. Additionally, devices having a camera positioned adjacent to other components may have a limited field of view or have other undesirable properties.

SUMMARY

Embodiments of the present invention are directed to an electronic device having a lens incorporated into a transparent cover. In some example embodiments, an electronic device includes an enclosure component defining a first portion of an external surface of the electronic device. The electronic device also includes a display at least partially positioned within the enclosure component and a cover sheet coupled to the enclosure component and defining a second portion of the external surface of the electronic device. The cover sheet has a recess defining a first contour. A camera system is positioned below the cover sheet and includes a camera module, and a lens coupled to the camera module and defining a second contour that corresponds to the first contour of the recess. The lens is positioned at least partially within the recess of the cover sheet.

In some embodiments, the second portion of the external surface defines an entire rear surface of the electronic device. In some embodiments, the second portion of the external surface defines at least an entire front face of the electronic device. The electronic device may also include a second or rear cover sheet that defines at least an entire rear surface of the electronic device. In some implementations, the cover sheet has a thickness of between 0.1 mm and 1.0 mm. In some instances, the cover sheet has a thickness of between 0.2 mm and 1.0 mm.

In some embodiments, the camera module comprises an image sensor positioned below the lens. The first contour and the second contour may be configured to direct light to the image sensor.

In some example embodiments, the cover sheet is positioned over the display and the camera system may be positioned along a side of the display. The lens may be positioned fully within the recess. In some implementations, the electronic device further comprises an optical filler positioned between the lens and the recess. The optical filler may be index matched to one or both of the cover sheet or the lens.

In some implementations, the cover sheet defines a first surface and a second surface that is opposite to the first surface. The recess may be formed within the second surface of the cover sheet. The cover sheet may include a first compressive stress region formed along the first surface and over the recess, and the cover sheet may include a second compressive stress region formed along the first surface and at least partially surrounding the first compressive stress region. The first compressive stress region may have a thickness that is less than the second compressive stress region.

Some example embodiments are directed to an electronic device having a display and an enclosure at least partially surrounding the display and defining a transparent window region. The enclosure includes a front surface defining at least a portion of a front face of the electronic device, and a rear surface opposite to the front surface. A recess having a contoured profile may be formed along the rear surface and at least partially within the transparent window region of the enclosure. A camera system may be positioned within the enclosure and include a camera module, and a lens coupled to the camera module and positioned at least partially within the recess. In some embodiments, the contoured profile is a first contoured profile and the lens defines a second contoured profile. The first contoured profile of the enclosure may correspond to the second contoured profile of the lens. In some embodiments, an optical interface element is positioned between the lens and a surface of the recess. The optical interface element may be a fluid that is optically matched to one or both of the transparent window region or the lens.

In some embodiments, the lens is a first lens, and the enclosure defines a contoured region that defines a second lens.

In some embodiments, the enclosure is formed from a monolithic glass component that defines a front, rear, and side external surfaces of the electronic device.

In some embodiments, the electronic device further comprises a touch sensor that is configured to detect a touch input along the front surface of the enclosure. The display may be configured to depict a graphical output that is responsive to the touch input.

In some embodiments, the camera system is configured to capture an image of a user, and the electronic device is configured to authenticate an identity of the user based on the captured image.

Some example embodiments are directed to a method of forming a cover sheet for an electronic device. The method may include machining a recess into a glass material and heating the glass material at or above a transition temperature. The method may also include pressing the heated glass material using a mold. While pressing the heated glass material, a contoured recess may be formed from at least a portion of the glass material defining the machined recess. The contoured recess may be configured to conform or correspond to a contour defined by an exterior surface of a lens of a camera of the electronic device.

The method may also include chemically strengthening at least a portion of the glass material that forms the contoured recess. Chemically strengthening the portion of the glass material that forms the contoured recess may include: forming a first compressive stress profile by immersing the glass material in a first chemical bath having a first concentration of an ion for a first duration, and forming a second compressive stress profile by immersing the glass material in a second chemical bath having a second concentration of the ion for a second duration. In some embodiments, the second concentration is greater than the first concentration, and the second duration is less than the first duration. In some cases, the ion comprises one or more of sodium, lithium, or potassium.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like elements.

Figure 1A:
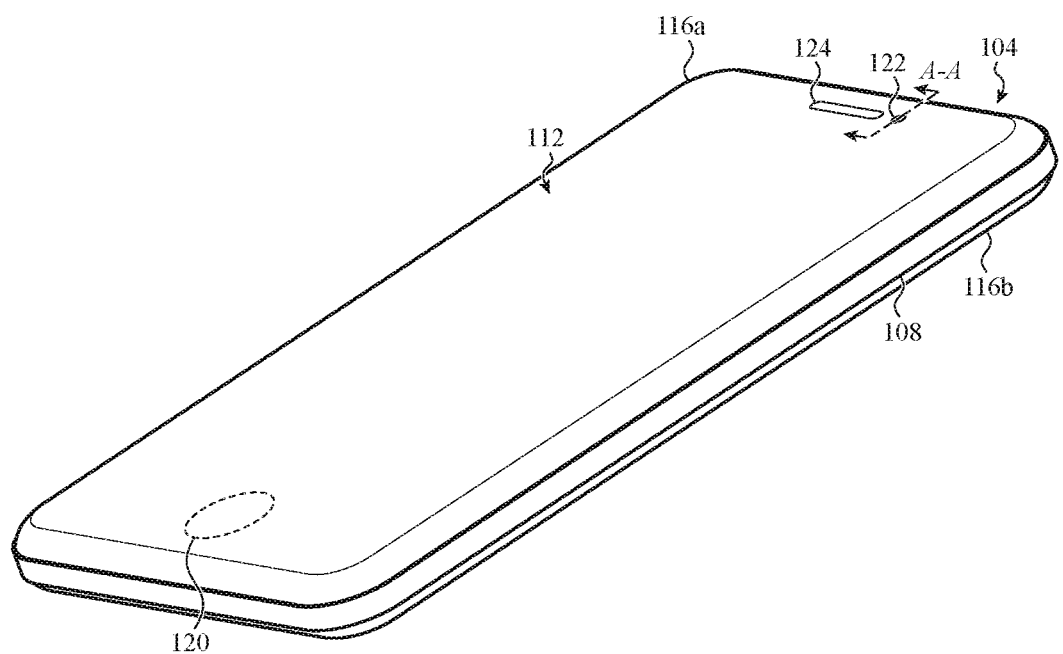
FIG. 1A depicts an example electronic device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes example systems, methods, and apparatuses that embody various elements of the present disclosure. However, it should be understood that the described disclosure may be practiced in a variety of forms in addition to those described herein.

The present disclosure describes systems, devices, and techniques related to electronic devices having a camera system incorporated at least partially within an exterior cover, wall, and/or other component of the device. The electronic device may include a cover sheet, which may be transparent or otherwise have a transparent window portion or region along an exterior surface. As used herein, "transparent" may generally refer to a material or layer that allows light to pass without being scattered, thereby allowing light, optical patterns, images, and the like to pass through a thickness of the material substantially undistorted. A camera system may be positioned within the electronic device and used to detect images through the cover sheet or window. However, a thickness of the cover sheet may separate the camera system from the exterior surface, which may impact the operability of the camera system and the overall profile of the device.

The structures and techniques of the present disclosure may allow the camera system to be positioned at least partially within or otherwise incorporated within the cover sheet of the electronic device. For example, the cover sheet may have a recess that extends at least partially into an inner surface of the cover sheet, which may also be referred to herein as a "blind recess" or simply a "recess." The camera system may be at least partially positioned within the blind recess, thereby reducing a distance of the camera system to the exterior surface of the device. This may expand a field of view of the camera system, for example, by allowing the camera system to be positioned closer to the exterior surface than various other internal components of the electronic device, such as ink, display elements, or the like that may be laminated or otherwise attached to the inner surface of the cover sheet. Positioning the camera system closer to the exterior surface may also facilitate a reduction in an overall thickness or profile of the device.

The cover sheet may be configured to allow light into the interior of the electronic device in a manner that mitigates lensing, diffusion, scattering, and/or other optical effects that may hinder the operation of the camera system. In one embodiment, the recess positioned along an inner surface of the cover sheet may be a contoured recess having a first contour or contour profile. The camera system may include a lens having a second contour or contour profile that corresponds to the first contour or contour profile of the recess. As described herein, the lens may be positioned at least partially within the recess and the corresponding contours may allow light to pass from the cover sheet to the lens without substantially obstructing or blocking an optical path between the cover sheet and the lens. In some cases, an optical interface element may be positioned along the first contour of the recess and the second contour of the lens and be optically matched with the cover sheet or the lens. The corresponding contours may reduce or eliminate optical distortions and may help to maintain or preserve the optical path of light that propagates through the cover sheet and the lens and into the image sensor of the camera.

To facilitate the foregoing, in one embodiment, the cover sheet, transparent window, and/or other appropriate structure may be formed using a precision molding process. To illustrate, the cover sheet may be formed at least partially from a glass material. As used herein, "glass material" may generally refer broadly to a variety of transparent materials, including substantially non-crystalline amorphous solids and/or materials having at least some crystalline structures, such as glass ceramics of various compositions. Example compositions of the glass material may include soda lime, boro-silicate (and variations thereof), high silica content (96% or greater), zinc titanium, or the like. Crystalline structures may include various sapphire compositions and/or other compositions such as crystalline structures having a mixture of aluminum oxide, silicon oxide, and at least one of lithium oxide, magnesium oxide, or zinc oxide. The glass material may include other constituent components or may be formed from a composite material.

The glass material may be mechanically shaped (e.g., pressed) in order to form a desired shape. For example, the glass material may be heated to at or above a transition temperature. The transition temperature may be substantially any temperature that allows for deformation or shaping without inducing brittle failure or other undesirable stresses in the material. The glass material may be subsequently pressed in a mold. The pressing may involve forcing a protrusion or other feature of a mechanical press into the glass material and forming the contoured recess (also referred to as a contoured blind recess). The protrusion may be configured to form the contoured recess having a contour or contour profile that matches a contour or contour profile of a lens of a camera system. In some cases, the protrusion may be advanced into an uninterrupted or continuous surface of a heated block, gob, or other form of glass material in order to form the contoured recess. In other cases, the protrusion may be advanced toward a machined recess in the glass material and form the contoured recess from a portion of the glass material defining the machined recess. The contoured recess formed from the mechanical pressing may define a contour that matches a contour of a lens. This may reduce or mitigate the need for lapping or polishing the recess after machining or pressing.

The glass material may be thinner at the contoured recess than at adjacent portions of the glass material. Accordingly, the glass material may be strengthened along the contoured recess in order to reduce possible failure mechanisms or defects at the thinned region, such as chipping, cracking, and the like. In one embodiment, a compressive stress region may be formed along the contoured recess. Such compressive stresses may mitigate potential failure mechanisms, for example, by preventing crack propagation along the edges. Chemical strengthening may be used to form the compressive stress region, such as by exchanging alkali ions of the glass with molten salts or other ions of an equilibrium reaction. In some cases, the chemical strengthening is specially adapted to accommodate a recess in a thin glass sheet. For example, the thickness of the compressive stress may be less over a first region that overlaps the recess as compared to a second region that surrounds or is proximate to the recess. In another example, the compressive stress may have a spiked profile or compressive stress gradient that allows for higher compressive stresses near the surface of the glass sheet. As described herein, a compressive stress gradient may be formed along the recess such that relatively higher compressive stresses are formed proximate a surface of the glass material with relatively lower compressive stresses formed into the thickness, among other variations.

It will be appreciated that, in any of the embodiments described herein, the cover sheet, transparent window, and/or other transparent component may be used in a variety of applications. In a particular embodiment, the transparent sheet may be, or form a portion of, a cover (e.g., a cover glass) for a mobile phone. In other embodiments, the transparent sheet may form an exterior surface of another electronic device, such as a phone, notebook, watch, camera, or the like, described in greater detail below. The cover sheet may optionally be coupled to substantially opaque components, such as other enclosure components or structural members of the electronic device. The transparent sheet, or any transparent structure, may define various external contours of the electronic device, including planar and non-planar geometries. As a non-limiting example, the transparent sheet may define a contoured, curved, angled, irregular, and/or other external contour of a mobile phone cover. According to the techniques described herein, the contoured recess may be formed into an underside of the transparent glass sheet for various external contours, thereby enhancing the adaptability of the transparent glass sheet for a variety of applications.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

FIG. 1A depicts an example electronic device 104 (also referred to herein as "electronic device 104"). The electronic device 104 may include a cover sheet, such as the cover sheet discussed above and described in greater detail below. The cover sheet may define one or more portions (e.g., first portion, second portion) of an external surface of the electronic device 104. In some cases, this may be a contoured exterior surface of the electronic device 104, for example, such as the contoured edges shown in FIG. 1A. Below the exterior surface, the cover sheet may include a contoured recess (also referred to as a contoured blind recess). The contoured recess may be configured to receive at least a portion of a camera system, such as a lens. The contoured recess may have a contour or contour profile that matches or corresponds to a contour or contour profile of the lens. This may enhance the operability of the camera system and/or decrease a thickness of the electronic device 104.

As shown, the electronic device 104 is a smart phone, though it can be any suitable electronic device having a cover sheet and/or other exterior component that is configured to incorporate a camera system, according to the embodiments described herein. Some example electronic devices may include desktop computers, notebook computers, mobile phones, portable media players, tablet computing devices, or the like. Other example electronic devices may include wearable devices (including electronic smart watches, wrist-worn devices, headbands, or the like), health monitoring devices (including wrist-worn electronic devices, some smart watches, pedometers, heart rate monitors, or the like), and other electronic devices, including digital cameras, printers, scanners, security systems or devices. It will be appreciated, however, that while the cover sheet is shown as a component of the electronic device 104, the cover sheet of the present disclosure may be or define a variety of other components, including components of a substantially mechanical (non-electrically actuated or controlled) system. As such, the discussion of any electronic device and cover sheet, such as the electronic device 104 and the cover sheet implemented therein, is meant as illustrative only.

For purposes of illustration, the electronic device 104 is depicted as having an enclosure component 108, a display region 112, a front cover 116a, a rear cover 116b, one or more input/output members 120, a camera 122, and a speaker 124. It should be noted that the electronic device 104 may also include various other components, such as one or more ports (e.g., charging ports, data transfer ports, or the like), additional input/output buttons, and so on. Other components of an example electronic device are described below with respect to FIG. 11.

Figure 1B:
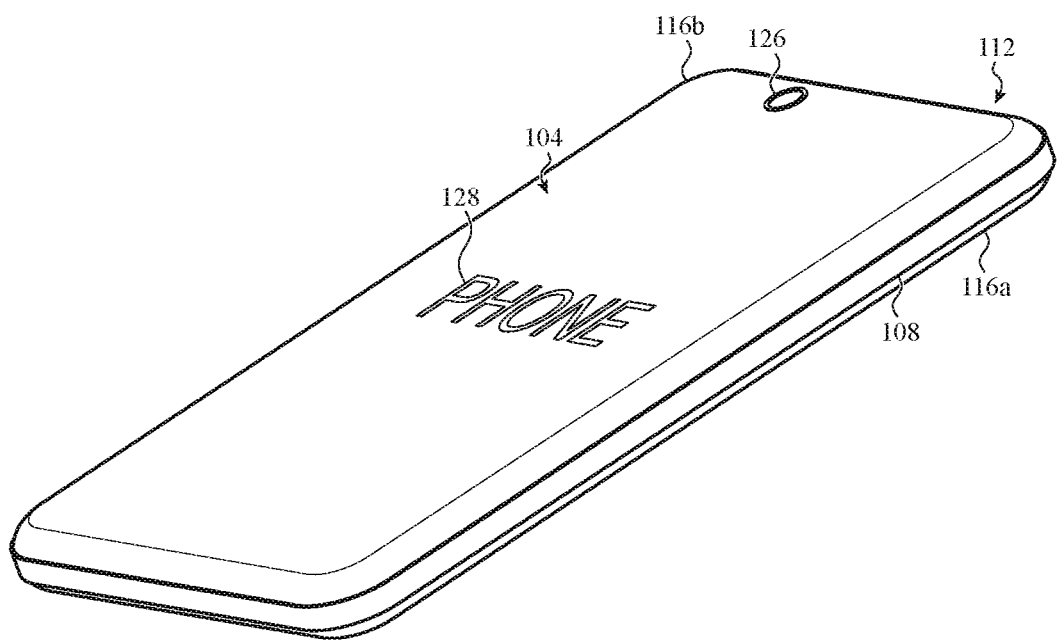
FIG. 1B depicts a rear view of the example electronic device of FIG. 1A.

In an embodiment, the enclosure component 108, the front cover 116a, the rear cover 116b, and/or other component of the electronic device 104 may be formed from, or include, a cover sheet or otherwise be transparent or have a transparent window region or portion. The display, positioned at least partially within the enclosure component 108, may be configured to display graphical output that is viewable or visible through the transparent window region or portion of the front cover 116a. As shown in FIG. 1A, the front cover 116a defines the entire front face or surface of the electronic device 104. As shown in FIGS. 1A and 1B, the enclosure component 108, the front cover 116a, and the rear cover 116b are three separate and distinct components that together define an enclosure of the electronic device 104. However, in some embodiments, the enclosure component 108, the front cover 116a, and the rear cover 116b are formed together as a single monolithic structure or component. For example, a single monolithic glass component may form the front, rear, top, bottom, and/or sides of the enclosure of the electronic device 104. In another alternative embodiment, the enclosure component 108 defines the entire rear face or surface of the enclosure, as well as the top, bottom, and/or the sides of the enclosure.

Accordingly, one or more of the enclosure component 108, the front cover 116a, or the rear cover 116b may be positioned over or enclose a camera system with the electronic device 104, and the camera system may be configured to detect images of an external environment. For example, as shown in the embodiment of FIG. 1A, the front cover 116a may be formed from a glass sheet or otherwise be transparent or have a transparent window region or portion that is positioned over a camera 122. The front cover 116a may therefore function as a protective window over the camera 122. The front cover 116a may also be an optical component of the camera 122, such as defining a lens or otherwise being configured to alter an optical path of light toward the camera 122. In some cases, such as that shown in FIG. 1A, the front cover 116a forms a fully exposed front face of the electronic device 104.

To facilitate the foregoing, the front cover 116a may include a contoured recess formed along an inner surface, opposite the external surface of the electronic device 104 (not shown in FIG. 1A). As described in greater detail below with respect to FIGS. 2, 3A and 3B, the contoured recess may allow a portion of the camera 122, such as one or more lenses, camera modules, image sensors, and so on, at least partially within the contoured recess. In some cases, this may help reduce an overall thickness of the electronic device 104.

The example electronic device 104 includes a touch-sensitive display also referred to as a touchscreen. In this example, the front cover 116a is positioned over a display or display element to define a display region 112. The display region 112 may be configured to depict a graphical output (e.g., symbol, glyph, graphic, animation, or other graphical element) that is responsive to received input. The input may be received along or at the front cover 116a, the rear cover 116b, the input/output member 120, and/or other button or surface. As described herein, the input may include touch input that is detected using a capacitive touch sensor or other touch sensor and/or visual input that is received by a camera or other optical device.

More generally, the enclosure component 108, the front cover 116a, the rear cover 116b, and/or other component of the electronic device 104 may be used to define a touch and/or force sensitive surface that may be used to manipulate graphical outputs at the display region 112. For example, one or more touch sensors (e.g., a capacitive touch sensor layer) and/or one or more force sensors (e.g., a capacitive or strain-based force sensing layer) may be attached to or otherwise coupled to the front cover 116a and/or the rear cover 116b. The graphical outputs at the display region 112 may be responsive to touch and/or force input detected using the touch sensor and/or force sensor. Additionally or alternatively, the graphical outputs along the display region 112 may be responsive to an optical or visual input received by the camera 122 or other sensor.

In the example embodiment of FIG. 1A, the front cover 116a is shown as defining at least a portion of an external surface of the electronic device 104. Display elements within the electronic device 104 may propagate through a thickness of the front cover 116a and produce the graphical outputs of the display region 112. One or more sensors below the front cover 116a may detect input along the external surface and, in response to the detection, the graphical outputs may change. While FIG. 1A shows the front cover 116a as defining the display region 112, it will be appreciated that the rear cover 116b may also define a display region 112, and be formed from a light-transmissive glass sheet, such as that shown in FIG. 1B.

FIG. 1B depicts a rear view of the example electronic device 104. In particular, FIG. 1B shows an embodiment where the rear cover 116b defines an entire rear face or surface of the electronic device 104. The rear cover 116b may include or define a glyph 128, including various symbols, markings, and so on that may be formed into, and/or applied to, the rear cover 116b.

As described above, the rear cover 116b may be formed from a glass sheet and/or otherwise include a transparent window region or portion. This may allow the rear cover 116b to be positioned over and/or incorporated with a rear camera 126. In some cases, the rear cover 116*b* may include a contoured recess, similar to that described above with respect to the front cover 116*a*. In this regard, the rear camera 126 may be positioned at least partially within the contoured recess and therefore incorporated at least partially into a thickness of the rear cover 116*b*. While the following examples are provided with respect to a cover that forms the front cover 116*a* of the device 104, the examples can be similarly applied to the rear cover 116*b*.

Figure 2:
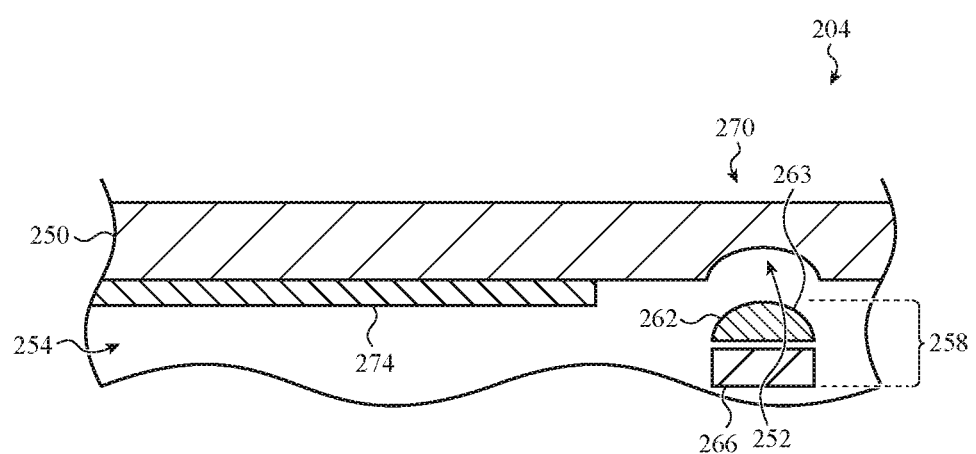
FIG. 2 depicts a cross-sectional view of the example electronic device of FIG. 1A, taken along line A-A of FIG. 1A.

FIG. 2 depicts a cross-sectional view of an electronic device 204. The electronic device 204 may be substantially analogous to the electronic device 104 described above with respect to FIGS. 1A and 1B. The electronic device 204 may therefore include similar components and/or perform similar functions of the electronic device 104, including having a front cover, rear cover, enclosure component, display region, speaker, camera, and one or more input/output members, redundant explanation of which is omitted here for clarity. Accordingly, for purposes of illustration, the cross-sectional view of the electronic device 204 may correspond to line A-A of FIG. 1A. However, it will be appreciated that the cross-sectional view shown in FIG. 2 may be taken along substantially any portion of an external surface of the electronic device 204 and is shown in FIG. 2 for purposes of illustration.

As shown in FIG. 2, the electronic device 204 may include a cover sheet 250. The cover sheet 250 may form a portion of an exterior surface of the electronic device 204. In some cases, the cover sheet 250 may be or form a portion of a front cover, a rear cover, an enclosure component, and/or other appropriate component of the electronic device 204. The cover sheet 250 may have a thickness of between 0.2 mm and 1.0 mm; however, in other cases, the cover sheet 250 may be less than 0.2 mm or greater than 1.0 mm, as appropriate for a given application. In some cases, the cover sheet 250 may have a thickness between 0.1 mm and 1 mm. The cover sheet 250 may at least partially define an interior volume 254 of the electronic device 204. The interior volume 254 may house various electrical and/or mechanical components of the electronic device 204, as described herein.

The electronic device 204 may include a camera system 258. The camera system 258 may be positioned within the interior volume 254 and below the cover sheet 250. For example, the camera system 258 may be positioned below the cover sheet 250 along an inner surface that is opposite to the external surface of the electronic device 204. In this example, the camera system 258 is positioned below a recess 252 formed along the inner surface of the cover sheet 250. The recess 252 may define a first contour that is substantially matched to or corresponds to a second contour of the camera system 258.

The camera system 258 may generally be configured to detect light that propagates through the cover sheet 250. In some cases, the camera system 258 may be configured to detect images, optical patterns, and/or other elements of an external environment. In one example, the camera system is configured to capture an image of a user's face and the device is configured to authenticate the user based on the captured image. The image may be a color image or may be a point map of a user's face that includes data regarding the location of various points along the user's face, which may be used to identify or authenticate the user.

To facilitate the foregoing, the camera system 258 may include at least a lens 262 and a camera module 266. The lens 262 may include one or more transparent components that cooperate to modify a direction of light toward the camera module 266. For example, in an embodiment, the lens 262 may include a first lens and second lens, and each of the first lens and the second lens may define a respective portion of a contoured lens surface. The camera module 266 may include an image sensor that detects light and can be used to optically recognize images, facial features, or other optical patterns.

In the embodiment of FIG. 2, the camera module 266 is positioned below the cover sheet 250. The camera system 258 may be positioned below the cover sheet 250 along a transparent window region 270. The transparent window region 270 may be a portion of the cover sheet 250 that is free from markings, textures, inks, and so on. In some cases, the transparent window region 270 may be a transparent portion of a cover sheet that may have substantially opaque regions adjacent the transparent window region 270. In this regard, light may propagate through the cover sheet 250, or other component or layer, along the transparent window region 270. The camera system 258 may be configured to detect and/or capture light that is propagated through the transparent window region 270 of the cover sheet 250. It will be appreciated that other portions, including substantially all, of the cover sheet 250 may also be free from markings, textures, inks, and so on, as may be appropriate for a given application. In some cases, other portions of the cover sheet 250 may be partially covered by an ink or marking and, in some cases, may be translucent, opaque, or otherwise not perfectly transparent.

FIG. 2 shows the camera system 258 positioned adjacent a display 274. The display 274 may be one of a variety of functional components positioned within the interior volume 254 of the electronic device 204. In some cases, the display 274 and/or other functional components positioned within the interior volume 254 may limit the field of view of the camera system 258, particularly if the camera system 258 is positioned close to the edge of the display 274. Thus, as described below with respect to FIGS. 3A and 3B, at least a portion of the camera system 258 may be positioned within the recess 252, which may increase the field of view of the camera system 258.

Figure 3A:
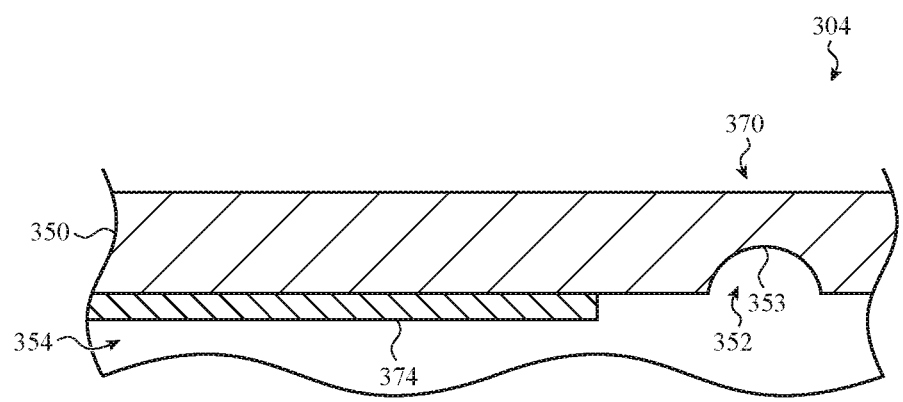
FIG. 3A depicts a cross-sectional view of another embodiment of the example electronic device of FIG. 1A, taken along line A-A of FIG. 1A.
Figure 3B:
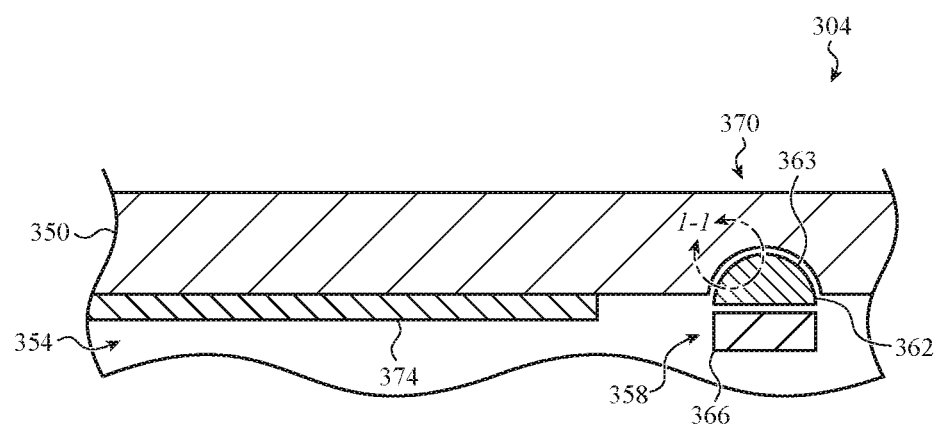
FIG. 3B depicts a cross-sectional view of the example electronic device of FIG. 1A, taken along line A-A of FIG. 1A, having a camera system.

FIGS. 3A and 3B depict a cross-sectional view of an electronic device 304. The electronic device 304 may be substantially analogous to the electronic devices described herein. The electronic device 304 may therefore include similar components and/or perform similar functions of the described electronic devices, including having a front cover, rear cover, enclosure component, display region, speaker, camera, and one or more input/output members, and, as depicted in FIGS. 3A and 3B, a cover sheet 350, an interior volume 354, a camera system 358, a lens 362, a camera module 366, a transparent window region 370, and a display 374. Redundant explanation of these components is omitted here for clarity. Accordingly, for purposes of illustration, the cross-sectional view of the electronic device 304 may correspond to line A-A of FIG. 1A. However, it will be appreciated that the cross-sectional view shown in FIGS. 3A and 3B may be taken along substantially any portion of an external surface of the electronic device 304 and is shown in FIGS. 3A and 3B for purposes of illustration.

With reference to FIG. 3A, the cover sheet 350 is shown having a recess, specifically blind recess 352. The blind recess 352 may be a thinned and contoured region along an underside or inner surface of the cover sheet 350. In particular, the blind recess 352 may be positioned along an inner surface of the cover sheet 350 at the transparent window region 370. Accordingly, light from an external environment of the electronic device 304 may propagate through the cover sheet 350 at the transparent window region 370 and into the blind recess 352.

As shown in FIG. 3A, the blind recess 352 may have a contoured surface or contoured profile. In FIG. 3A, the blind recess 352 is shown having a contoured profile 353 for purposes of illustration. The contoured profile 353 may correspond to or match a contoured profile of an exterior surface of a lens, for example, such as lens 362. As explained in greater detail below, this may allow light to exit the cover sheet 350 at the blind recess 352 and propagate into the lens, or other optical component, without altering a path of the light or otherwise distorting an image that is detected by a camera module coupled with the lens. It will be appreciated that the contoured profile 353 is shown in FIG. 3A has an illustrative semi-circular shape; however, in other embodiments, the contoured surface of the blind recess 352 may be substantially any shape, contour, or other geometry that is configured to correspond or match a contour of a lens.

With reference to FIG. 3B, the electronic device 304 is shown having the camera system 358 at least partially positioned within the blind recess 352. In particular, the lens 362 may be at least partially positioned within the blind recess 352. In other cases, the lens 362 may be fully positioned within the blind recess 352 and/or partially or fully removed from the blind recess 352, as may be appropriate for a given application. By positioning at least some portion of the camera system 358 within the blind recess 352, an overall thickness of the electronic device 304 may be reduced.

As described herein, the cover sheet 350 may be configured to direct light received at the transparent window region 370 toward the lens 362. For example, the cover sheet 350 may receive light from an external environment at the transparent window region 370. Light received at the transparent window region 370 may propagate through the cover sheet 350 and into the blind recess 352. In particular, light may exit the cover sheet 350 at the contoured profile 353. As described herein, the contoured profile 353 may be configured to match or correspond to a contour of the lens 362, such as the lens contoured profile 363 shown in FIG. 3B. The matching contours of the blind recess 352 and the lens 362 may cooperate to maintain a direction of light within an interface between the cover sheet 350 and the lens 362. This may help reduce distortion, lensing, or other optical effects.

The camera system 358 is shown positioned at least partially within the blind recess 352 and adjacent the display 374. The display 374 is positioned within the interior volume 354 along an inner surface of the cover sheet 350. The camera system 358 may also be positioned adjacent other functional components, inks, and so on that are positioned below or along an inner surface of the cover sheet 350, not shown in FIG. 3B. Accordingly, the camera system 358, and lens 362 in particular, may be positioned closer to the external surface of the cover sheet 350 than the display 374 and/or other components. In some cases, this may increase a field of view of the camera system 358 as compared to configurations in which the camera system 358 is not positioned at least partially within a feature of the cover sheet 350. An increase in the field of view of the camera system 358 may be beneficial if the camera system 358 is used to perform facial recognition or otherwise used to perform user authentication. For example, a larger field of view may allow the electronic device 304 to capture an image of the user's face even when the electronic device 304 is resting flat on a table or desk.

Figure 4A:
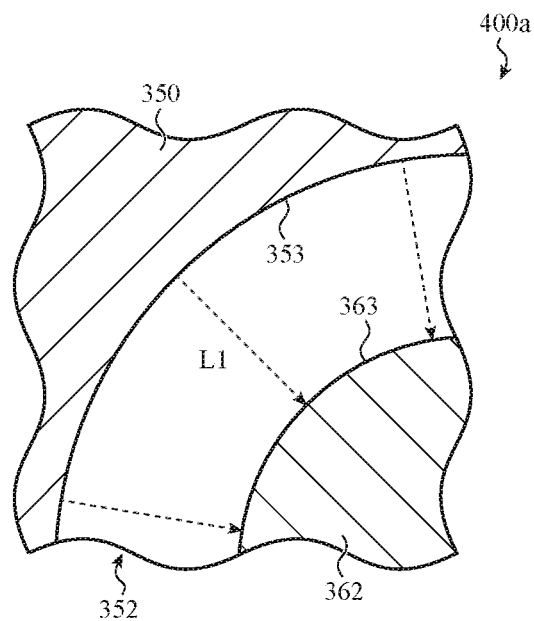
FIG. 4A depicts detail 1-1 of the cross-sectional view shown in FIG. 3B.
Figure 4B:
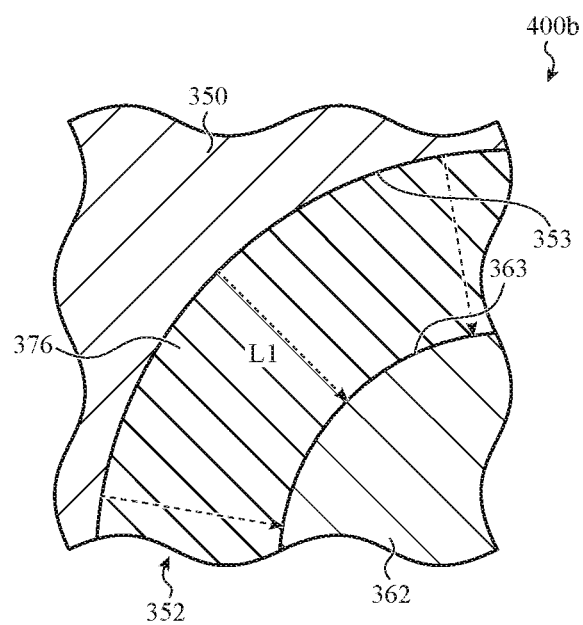
FIG. 4B depicts detail 1-1 of another embodiment of the cross-sectional view shown in FIG. 3B.

FIGS. 4A and 4B depict detail 1-1 of the electronic device 304 of FIGS. 3A and 3B. In particular, detail 1-1 may show a portion of an optical interface region of the electronic device 304. The optical interface region may be a region at which light travels between, for example, the cover sheet 350 and the lens 362. As described herein, at least a portion of the lens 362 may be positioned within the blind recess 352. The lens 362 may be separated from the cover sheet 350 within the blind recess 352. The lens 362 may be configured to detect light that exits the cover sheet 350 at the blind recess 352.

As described herein, the cover sheet 350 and the lens 362 may have corresponding or matching contours at the optical interface region. In this manner, a uniform light interface may be defined between the cover sheet 350 and the lens 362. The uniform light interface may reduce distortion of the light between the cover sheet 350 and the lens 362, thereby allowing the lens 362 to detect images substantially through the cover 350. As described below with respect to FIGS. 4A and 4B, the matching contours between the cover sheet 350 and the lens 362 may result in a uniform space or gap between the components, which may help minimize optical distortions or optical artifacts due to the interface between the components.

As shown in FIGS. 4A and 4B, the blind recess 352 may have a recess contoured profile 353 and the lens may have a lens contoured profile 363 that corresponds to the recess contoured profile 353. Specifically, the recess contoured profile 353 may be a first contour defined by the cover sheet 350 and the lens contoured profile 363 may be a second contour defined by the lens 362, which may conform with, match, or otherwise correspond to the first contour defined by the cover sheet 350. For example, each of the recess contoured profile 353 and the lens contoured profile 363 may have a similar profile, contour, shape, or other geometric property. In some cases, a uniform space or gap between the components may allow light to travel through the cover sheet 350 to the lens 362 though the interface without substantially distorting an image or other optical pattern to be captured by the camera.

With reference to FIG. 4A, a portion of an optical interface region 400a is shown. The optical interface region 400a may correspond to an embodiment where the lens 362 is positioned at least partially within the blind recess 352 and separated from the cover sheet 350 by an offset. In particular, in the embodiment of FIG. 4A, the lens 362 may be separated from the cover sheet 350 by an air gap. In this regard, the optical interface region 400a may be substantially free of intervening layers between the cover sheet 350 and the lens 362, such as an optical filler or optical interface component. For certain light that enters the cover sheet 350, light may travel along a light path L1 between the cover sheet 350 and the lens 362, as shown in FIG. 4A.

With reference to FIG. 4B, a portion of an optical interface region 400b is shown. The optical interface region 400b may correspond to an embodiment when the lens 362 is positioned at least partially within the blind recess 352 and separated from the cover sheet 350 by an offset. In particular, in the embodiment of FIG. 4B, the lens 362 may be separated from the cover sheet 350 by an optical filler or optical interface component 376. In some examples, the optical interface component 376 is an optical filler that includes a fluid or gel that is index matched or otherwise optically matched to one or both of the cover sheet 350 or the lens 362. In this regard, the optical interface component 376 may reduce light reflection and refraction between the cover sheet 350 and the lens 362. For certain light that enters the cover sheet 350, light may generally travel along a light path L1 between the cover sheet 350 and the lens 362, as shown in FIG. 4B.

In some examples, the optical interface component 376 includes one or more fiber optic elements, waveguides, or other components that are configured to help direct or maintain the direction of light that enters the lens 362 from the cover sheet 350. In some cases, the fiber optic elements may help to increase the field of view or the amount of light that is able to enter the lens and eventually the camera module. The fiber optic elements may be positioned along a portion of or the entire optical interface between the lens 362 and the cover sheet 350.

Figure 5:
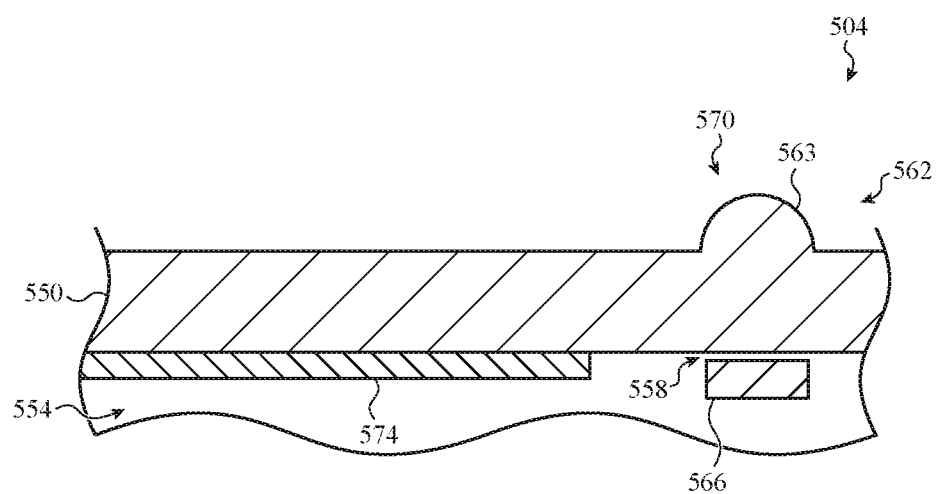
FIG. 5 depicts a cross-sectional view of another embodiment of the example electronic device of FIG. 1A, taken along line A-A of FIG. 1A.

FIG. 5 depicts a cross-sectional view of an electronic device 504. The electronic device 504 may be substantially analogous to the electronic devices described herein. The electronic device 504 may therefore include similar components and/or perform similar functions of the described electronic devices, including having a front cover, rear cover, enclosure component, display region, speaker, camera, and one or more input/output members, and, as depicted in FIG. 5, a cover sheet 550, an interior volume 554, a camera system 558, a lens 562, a camera module 566, a transparent window region 570, and a display 574. Redundant explanation of these components is omitted here for clarity. Accordingly, for purposes of illustration, the cross-sectional view of the electronic device 504 may correspond to line A-A of FIG. 1A. However, it will be appreciated that the cross-sectional view shown in FIG. 5 may be taken along substantially any portion of an external surface of the electronic device 504 and is shown in FIG. 5 for purposes of illustration.

In the embodiment of FIG. 5, the cover sheet 550 may form a portion of the camera system 558. For example, the cover sheet 550 may have a contoured exterior surface 563 positioned at the transparent window region 570. The contoured exterior surface 563 may allow a portion of the cover sheet 550 to define the lens 562. For example, the contoured exterior surface 563 may allow the cover sheet 550 to receive light, and modify a direction of the received light as it travels toward the interior volume 554. The contoured exterior surface 563 may modify the direction of the light in a manner that allows the camera module 566 to detect images through the transparent cover 550. By forming the lens 562 from a portion of the cover sheet 550, a thickness of the electronic device 504 may be further reduced. A field of view of the camera system 558 may also be expanded, for example, due in part to the lens 562 defining an exterior surface of the electronic device 504.

The embodiment of FIG. 5 may be implemented, as shown, with a camera module 566 positioned below an inner surface of the cover sheet 550. However, the same principle may be applied to any of the previous examples. Specifically, the cover sheet 550 may include a contoured recess formed along an inner surface and the camera system 558 may have an additional lens that is positioned at least partially within the contoured recess. The examples described above with respect to FIGS. 3A and 3B depict such a nested lens configuration. Stated another way, the nested lens configuration of FIGS. 3A and 3B can be further modified by the configuration of FIG. 5 to include an additional, external lens 562 formed along the exterior surface of the cover sheet 550.

Figure 6:
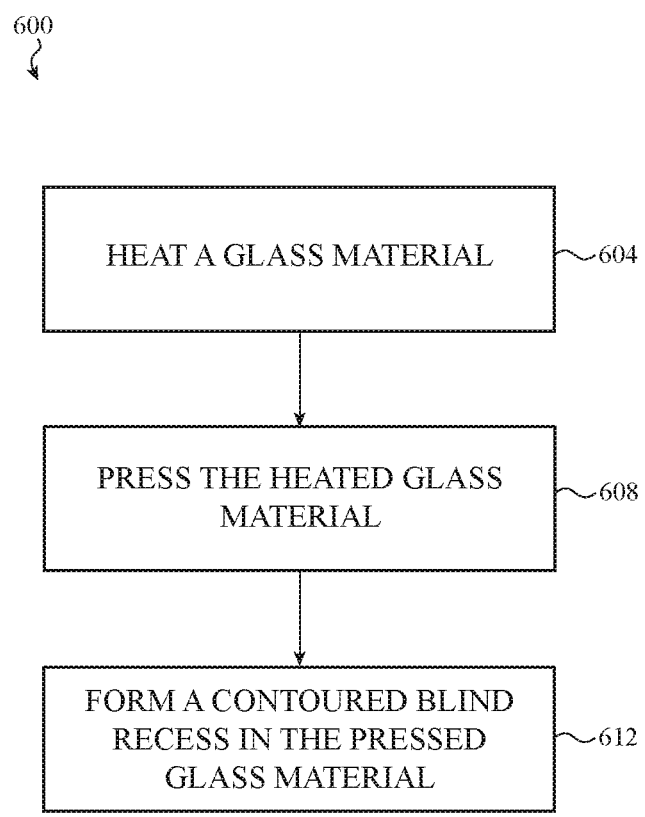
FIG. 6 depicts a flow diagram of a method of forming a cover sheet.

To facilitate the reader's understanding of the various functionalities of the embodiments discussed herein, reference is now made to the flow diagram in FIG. 6, which illustrates process 600. While specific steps (and orders of steps) of the methods presented herein have been illustrated and will be discussed, other methods (including more, fewer, or different steps than those illustrated) consistent with the teachings presented herein are also envisioned and encompassed with the present disclosure.

In this regard, with reference to FIG. 6, process 600 relates generally to forming a cover sheet. The process 600 may be used to form or manufacture any of the cover sheets described herein, for example, such as the cover sheet 250, the cover sheet 350, and/or the cover sheet 550, and variations and embodiments thereof. Accordingly, the cover sheet formed using the method described with respect to FIG. 6 may be used as a component of, or define, a front cover, a rear cover, an enclose component, and/or any other component of the various electronic devices described herein that implement a cover sheet.

At operation 604, a glass material may be heated at or above a transition temperature. The glass material may have a machined blind recess. For example and as shown in greater detail below with respect to FIGS. 7A-7D, a glass material, such as soda lime, boro-silicate (and variations thereof), high silica content (96% or greater), zinc titanium, or the like, may be heated. In particular, the glass material may be heated to at or above a transition temperature, such as a glass transition temperature, and/or any other appropriate temperature that may allow for deformation or shaping without inducing brittle failure or other undesirable stresses in the material. Accordingly, the glass material may be heated at the operation 604 to within a range of between 200° C. and 1000° C.; however, other temperatures are possible, including heating the glass material to a temperature of below 200° C. or to a temperature of greater than 1000° C. during the operation 604.

In some cases, the glass material may include ceramic crystalline structures, including certain compositions of sapphire and/or other compositions such as crystalline structures having a mixture of aluminum oxide, silicon oxide, and at least one of lithium oxide, magnesium oxide, or zinc oxide. For example, the glass material may nucleate and/or grow ceramic crystalline structures during the heating of the operation 604, or during the process 600 more generally. The ceramic crystalline structures may enhance one or more material properties of the glass material, and finished cover sheet, such as resiliency and resistance to chipping, fracturing, and so on. The material properties may be based on the size, density, and/or other characteristic of the ceramic crystalline structures. Accordingly, it may be desirable to control growth of the ceramic crystalline structures to a specified size or density during the shaping operation 604.

At operation 608, the heated glass material may be pressed in a mold. For example and as shown in greater detail below with respect to FIGS. 7A-7D, the heated glass material may be subjected to the mechanical forces of a press. The press may be used as an instrument of a precision molding process that is used to form one or more of the contoured surfaces of the cover sheets, as described herein. For example, the press may have a contoured surface that is forced against the heated glass material. As such, the heated glass material, which may be pliable, ductile, and so on due to the heating, may conform to the contoured surface of the press. Hydraulics may be used to manipulate the press; however, other mechanisms may also be used.

At operation 612, a contoured blind recess may be formed from a portion of the glass material defining the machined blind recess. This may occur while pressing the heated glass material. The contoured blind recess may be configured to conform to a contour defined by an exterior surface of a lens.

For example and as shown in greater detail below with respect to FIGS. 7A-7D, the glass material may have a machined blind recess prior to being subjected to the mechanical press of the operation 608 and/or the heating of the operation 604. For example, the machined blind recess may be drilled, ground, lapped, and/or otherwise mechanically formed into a surface of the glass material. The machined blind recess may have a substantially rough surface texture that may hinder the ability of the glass material to direct light into a lens substantially undistorted.

Accordingly, at the operation 612, a contoured blind recess may be formed from a portion of the glass material that defines the machined blind recess. For example, a protrusion or other feature of the press may be advanced toward the glass material at the machined blind recess. The protrusion may be forced against the portion of the glass material that defines the machined blind recess. This portion of the glass material may subsequently conform to the substantially smooth contoured surface of the protrusion. As such, upon release of the press, the portion of the glass material that had defined the machined blind recess may define a contoured recess. In a particular embodiment, the protrusion may have a contour corresponding to a contour of a lens and/or other optical component, and the glass material may conform to this contour. This may allow the contoured blind recess formed in the glass material to conform to a contour defined by an exterior surface of a lens.

Turning next to FIGS. 7A-7D, a cross-sectional view of a glass material is shown undergoing various processing steps. In particular, FIGS. 7A-7D depict the formation of a cover sheet, for example, such as that described above with respect to the process 600 of FIG. 6. It will be appreciated, however, that FIGS. 7A-7D are presented for purposes of illustration only; variations of the process 600, including different processing steps than those of FIGS. 7A-7D, are contemplated herein.

Figure 7A:
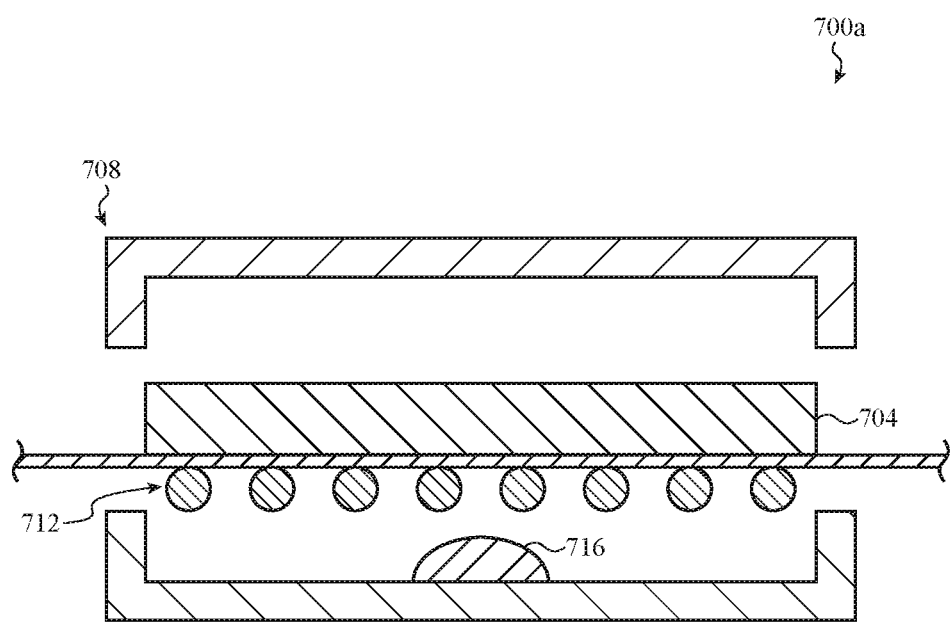
FIG. 7A depicts a cross-sectional view of a glass material undergoing the method of forming the cover sheet of FIG. 6.

With reference to FIG. 7A, a processing step 700a is shown. In the processing step 700a, a glass material 704 is shown being heated by a heating system 708. The processing step 700a may generally correspond to the operation 604 described above with respect to FIG. 6; however, this is not required. For example, the glass material 704 may be heated to at or above a transition temperature, such as to the glass transition temperatures described herein. This may allow the glass material 704 to be subsequently processed into a desired contour, such as by using one or more of the precision glass molding techniques, as described herein.

In the example embodiment of FIG. 7A, the heating system 708 may include a conveyance mechanism 712 and a heat source 716. The conveyance mechanism 712 may allow for rapid or sequential advancement of the glass material 704 through the heating system 708. The heat source 716 may be a furnace that is configured to output heat that is used by the heating system 708 to heat the glass material 704 to at or above the transition temperature. It will be appreciated, however, that the heating system 708 is shown for purposes of illustration, and that other heating systems may be used to implement one or more of the operations of the process 600 described above with respect to FIG. 6.

Figure 7B:
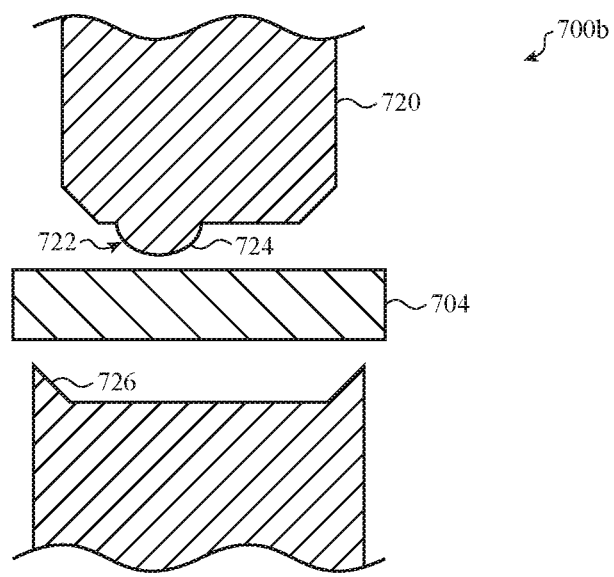
FIG. 7B depicts a cross-sectional view of a glass material undergoing the method of forming the cover sheet of FIG. 6.

With reference to FIG. 7B, a processing step 700b is shown. In the processing step 700b, the glass material 704 is shown positioned relative to a press 720. The processing step 700b may generally correspond to the operation 608 described above with respect to FIG. 6; however, this is not required.

In the example embodiment of FIG. 7B, the press 720 may be a mechanical or hydraulic press. The press 720 may thus be operable to exert a mechanical force on an object. The press 720 may be configured for use as an instrument of a precision molding process. For example, the press may include one or more contoured surfaces. The mechanical force exerted by the press may force the heated glass material to at least partially conform to the contoured surfaces of the press 720. The press 720 may subsequently be released, thereby forming a desired shape in the glass material, such as any of the contoured blind recesses, contoured cover edges, and so on described herein.

To facilitate the foregoing, the press 720 may be at least partially formed from or coated with a material configured to interact with the heated glass material in a manner that forms the contoured blind recess. For example, in certain embodiments, the press 720 may include mechanical members at least partially formed from and/or coated with graphite, tungsten carbide, and/or a platinum iridium composition. Such material may lower a coefficient of friction between the press 720 and the heated glass material 704, and thus may allow the press 720 to be released from the heated glass material 704 without substantially disturbing the contour formed during the pressing.

The press 720 may include a variety of shapes, geometries, contours, and so on in order to form a desired contour in the glass material 704. For example, as described herein, the glass material 704 may be used to form a component of an electronic device, such as a cover or an enclosure component, and therefore the press 720 may have a contour that corresponds to a desired contour of the finished part for the electronic device. In the example embodiment of FIG. 7B, the press 720 includes a protrusion 722. The protrusion 722 may be advanced toward, and pressed into, the heated glass material 704, as shown below with respect to FIG. 7C. This may form a contoured blind recess in the heated glass material 704. The protrusion 722 may have a protrusion contour 724. The protrusion contour 724 may correspond to a contour of a lens, and therefore the contoured blind recess of the heated glass material 704 may therefore, too, correspond to the contour of the lens when formed.

As another example, the press 720 may have an edge contour 726. The heated glass material 704 may be advanced toward and conform to the edge contour 726 when the press 720 is closed. This may form a contoured edge in the heated glass material 704. This may allow the heated glass material 704 to be used to form a component of a cover sheet, enclosure component, and/or substantially any of the components of the electronic devices described herein having contoured edges. In other cases, the press 720 may have more, fewer, or different contours, as may be appropriate for a given application.

Figure 7C:
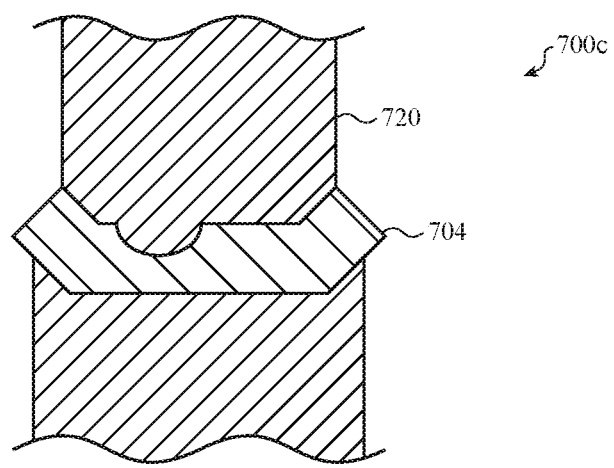
FIG. 7C depicts a cross-sectional view of a glass material undergoing the method of forming the cover sheet of FIG. 6.

With reference to FIG. 7C, a processing step 700c is shown. In the processing step 700c, the press 720 is shown exerting a mechanical force on the heated glass material 704. Due at least partially to the mechanical force of the press 720, one or more surfaces of the heated glass material 704 may conform to a contour or feature of the press 720. For example, the heated glass material 704 may conform to the protrusion contour 724, the edge contour 726, and/or other appropriate contour of the press 720. The processing step 700c may generally correspond to the operation 612 described above with respect to FIG. 6; however, this is not required.

Figure 7D:
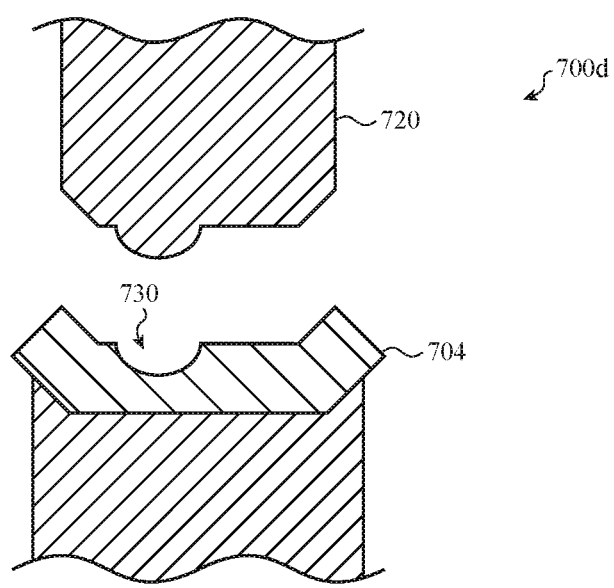
FIG. 7D depicts a cross-sectional view of a glass material undergoing the method of forming the cover sheet of FIG. 6.

With reference to FIG. 7D, a processing step 700d is shown. In the processing step 700d, the press 720 is shown being partially released from the heated glass material 704.

The press 720 may be released in a manner that allows the conformed portions of the heated glass material 704 to maintain a shape formed during, for example, the processing step 700c. For example, as shown in FIG. 7D, the heated glass material 704 may have a contoured blind recess 730 formed along an exterior surface. The heated glass material 704 may be subsequently cooled and used to form a component of an electronic device, such as a cover sheet, enclosure component, and so on, as may be appropriate for a given application.

In some embodiments, the glass material 704 may be strengthened around the blind recess 730. For example, a thickness of the glass material 704 may be reduced at the blind recess 730, and strengthening the glass material 704 may reduce potential failure mechanisms, including chipping. In some cases, the glass material 704 may be chemically strengthened along the blind recess 730. The chemical strengthening may involve forming a compressive stress region along the blind recess, for example, such as the compressive stress region 1008 described below with respect to FIG. 10A. The compressive stress region may have a compressive gradient that extends into a thickness of the glass material 704. In this manner, the glass material 704 may have relatively higher compressive stresses proximate an external surface of the glass material 704, than as compared to portions of the glass material 704 that are further from the external surface. This relationship between the thickness of the glass material 704 and the compressive stress may be illustrated by a depth of compressive-compressive stress curve, such as the curve 1066, described below with respect to FIG. 10B.

Chemically strengthening the glass material 704 may involve immersing the glass material 704 in one or more chemical baths. The chemical baths may contain various "equilibrium ions," including various molten salts or other ions that may be used in an equilibrium reaction. In some cases, this may include ions of sodium, lithium, and/or potassium of varying concentrations; however, in other cases, other ions may be used. The immersion of the glass material 704 in the chemical bath may initiate an equilibrium reaction, for example, such as one that exchanges alkali ions of the glass with the ions of the chemical bath. As the glass material 704 and the ions of the chemical bath reach an equilibrium state, compressive stresses may be formed into a thickness of the glass material 704. In some cases, such as that described below with respect to FIGS. 10A and 10B, glass materials may be sequentially immersed in different chemical baths (e.g., such as those having different ions, or different concentrations of ions), in order to initiate multiple equilibrium reactions. Based at least partially on the time that the respective glass material may be immersed in a particular chemical bath, a compressive stress gradient may be formed into a thickness of the material.

Figure 8:
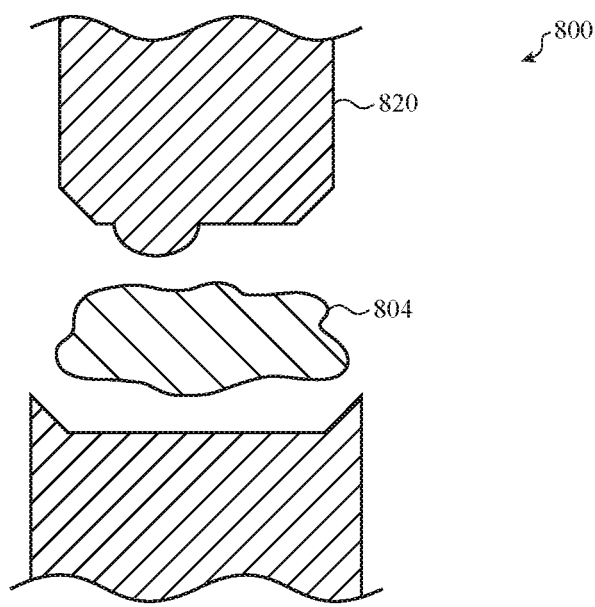
FIG. 8 depicts a cross-sectional view of another embodiment of a glass material undergoing the method of forming the cover sheet of FIG. 6.

FIG. 8 depicts a cross-sectional view of a glass material undergoing a processing step 800. The processing step 800 may be another embodiment of a processing step used in the formation of a cover sheet, for example, such as that described above with respect to the process 600 of FIG. 6. In particular, FIG. 8 shows a glass material 804 positioned relative to a press 820. The processing step 800 may generally correspond to the operation 608 described above with respect to FIG. 6; however, this is not required.

The glass material 804 and the press 820 may be substantially analogous to the various glass materials and presses described herein. Redundant explanation of these components is omitted here for clarity. Notwithstanding the foregoing similarities, the glass material 804 may be a glass gob. For example, rather than be a heated slab, block, or other shape having substantially regular surfaces, the glass material 804 may be an irregular or amorphous shape. This may allow the glass material 804 to take substantially any form prior to being manipulated by the press 820. The operation of the press 820, which may be analogous to the operation of the press 720 described above with respect to FIGS. 7A-7D, may form the amorphously shaped glass material 804 into a final desired shape. To facilitate the foregoing, the gob of material may have a predetermined mass, thereby allowing the glass material 804 to appropriately form the desired shape when the press 820 is actuated.

Figure 9:
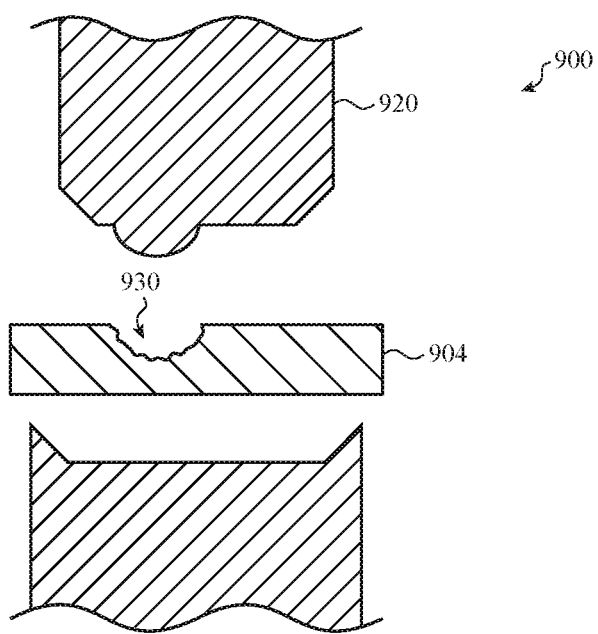
FIG. 9 depicts a cross-sectional view of another embodiment of a glass material undergoing the method of forming the cover sheet of FIG. 6.

FIG. 9 depicts a cross-sectional view of a glass material undergoing a processing step 900. The processing step 900 may be another embodiment of a processing step used in the formation of a cover sheet, for example, such as that described above with respect to the process 600 of FIG. 6. In particular, FIG. 9 shows a glass material 904 positioned relative to a press 920. The processing step 900 may generally correspond to the operation 608 described above with respect to FIG. 6; however, this is not required.

The glass material 904 and the press 920 may be substantially analogous to the various glass materials and presses described herein. Redundant explanation of these components is omitted here for clarity. Notwithstanding the foregoing similarities, the glass material 904 may have a machined blind recess 930. For example, the machined blind recess 930 may be drilled, ground, lapped, and/or otherwise mechanically formed into a surface of the glass material 904. This may occur before operation of the press 920. The machined blind recess 930 may have a substantially rough surface texture that may hinder the ability of the glass material 904 to direct light into a lens substantially undistorted. In some cases, the machined blind recess 930 is substantially smooth but has other surface irregularities or features that may be unsuitable for use with a camera module, as described herein.

The operation of the press 920, which may be analogous to the operation of the press 720 described above with respect to FIGS. 7A-7D, may form a contoured blind recess from a portion of the heated glass material 904 that defines the machined blind recess 930. For example, a protrusion or other feature of the press 920 may be advanced toward the heated glass material 904 at the machined blind recess 930. The protrusion may be forced against the portion of the heated glass material 904 that defines the machined blind recess. This portion of the heated glass material 904 may subsequently conform to the substantially smooth contoured surface of the protrusion. As such, upon release of the press 920, the portion of the heated glass material 904 that had defined the machined blind recess 930 may define a contoured blind recess. In a particular embodiment, the protrusion may have a contour corresponding to a contour of a lens and/or other optical component, and the glass material may conform to this contour. This may allow the contoured blind recess formed in the heated glass material 904 to conform to a contour defined by an exterior surface of a lens.

Figure 10A:
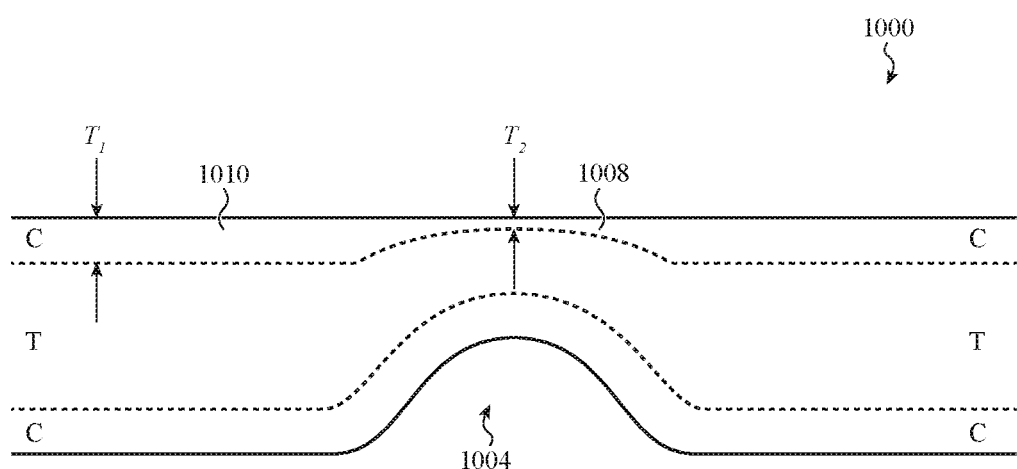
FIG. 10A depicts a cross-sectional view of a glass material having a strengthened region.
Figure 10B:
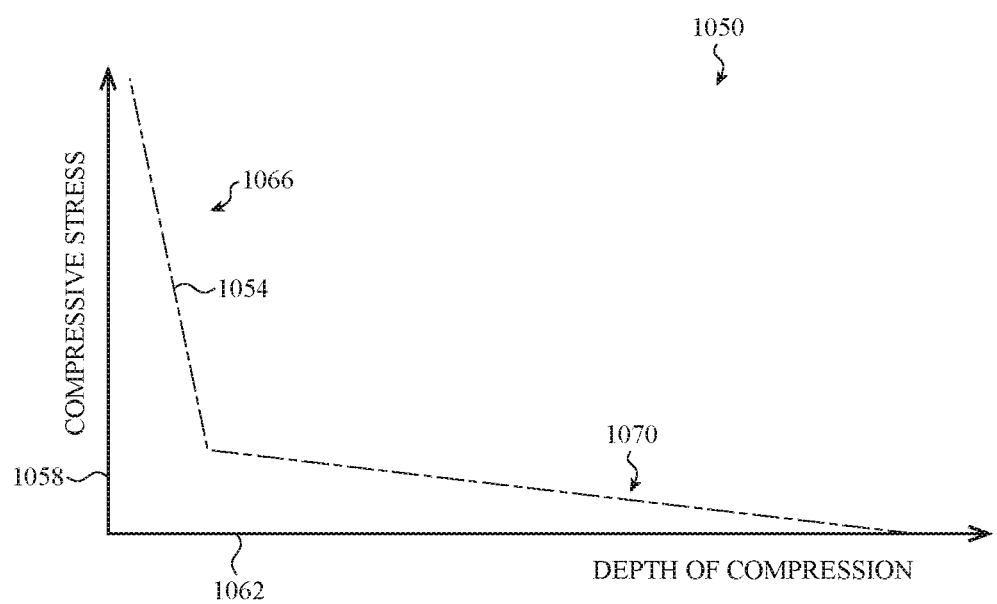
FIG. 10B depicts a compressive stress-depth of compression curve for a glass material.

FIGS. 10A and 10B relate to a cover sheet having a compressive stress region. As described herein, any of the cover sheets, glass materials, transparent windows, and so on may be strengthened in order to reduce potential failure mechanisms, including chipping. In some cases, the material may be chemically strengthened according to one or more of the methods described herein.

With reference to FIG. 10A, a cross-sectional view of a cover sheet 1000 is shown. The cover sheet 1000 may be substantially analogous to any of the cover sheets described herein. The cover sheet 1000 may therefore include similar components and/or perform similar functions of the described cover sheets, including having a blind recess 1004 that is configured to match a contour of a lens. Redundant explanation of these components and functions is omitted here for clarity.

In the embodiment of FIG. 10A, the cover sheet 1000 may be a strengthened glass material. For example, the cover sheet 1000 may be formed from any of the glass materials described herein and be strengthened in order to impair or mitigate crack propagation along an external surface of the cover sheet 1000. As shown in FIG. 10A, the cover sheet 1000 may exhibit internal compressive stresses within a thickness of the cover sheet 1000 indicated by compressive stress band C. The cover sheet 1000 may also exhibit internal tensile stresses within a thickness of the cover sheet 1000 indicated by tensile stress band T. The internal compressive and tensile stresses of the cover sheet 1000 may be formed from a variety of processes, including chemical strengthening, as described herein.

The cover sheet 1000 may exhibit different compressive stress regions and/or profiles based the blind recess 1004. As described herein, the cover sheet 1000 may be thinned at the blind recess 1004. Accordingly, as shown in FIG. 10A, a thickness of a compressive stress region C may also vary at or along a portion of the cover sheet 1000 having the blind recess 1004. In one embodiment, the compressive stress region C may have a thickness $T_1$ at a portion of the cover sheet 1000 that extends along a surface that surrounds or is adjacent to the blind recess 1004. As shown in FIG. 10A, the compressive stress region C may extend both the front and rear surfaces of the cover sheet 1000.

At a portion of the cover sheet 1000 that extends along and/or forms at least a portion of the blind recess 1004, the compressive stress region C may have a thickness $T_2$. In this example the portion of the cover sheet 1000 that is thinned due to the formation of the blind recess 1004 has a compressive stress region C with a thickness $T_2$ that is less than the thickness $T_1$. FIG. 10A depicts one example embodiment in which the outer compressive stress region C is thinner. However, in other embodiments, the compressive stress region C that is formed along at least a portion of a surface of the blind recess 1004 may have a reduced thickness similar to $T_2$.

Thus, as depicted in FIG. 10A, the cover sheet 1000 may have distinct compressive stress regions. For example, localized regions of the cover sheet 1000, such as those that extend across or are positioned along, the blind recess 1004, may be thinner and may exhibit greater compressive stresses than other regions of the cover sheet 1000. This may help reduce potential failure mechanisms at or near the blind recess 1004. This may also help preserve or maintain a thickness of the tensile stress region T, which may also improve the reliability and/or toughness of the cover sheet 1000.

In a particular embodiment, the cover sheet 1000 may have a first compressive stress region 1008 and a second compressive stress region 1010. The first compressive stress region 1008 may generally correspond to a region of the compressive stress band C that extends across or is positioned along the blind recess 1004 and generally has the thickness $T_2$. The second compressive stress region 1010 may generally correspond to a region of the compressive stress band C that is surrounding the blind recess 1004 and generally has the thickness $T_1$.

The first compressive stress region 1008 may exhibit a higher peak compressive stress but over a thinner region as compared to the second compressive stress region 1010. For example and as described in greater detail below with respect to FIG. 10B, the first compressive stress region 1008 may include a spiked or enhanced compressive stress profile in which compressive stress exhibited by the cover sheet 1000 is greatest at or near an external surface of the cover sheet 1000. The compressive stress may decrease or taper into a thickness of the cover sheet 1000. In some cases, the first compressive stress region 1008 may have a stepped compressive stress profile having multiple distinct compressive stress regions, such as that shown in FIG. 10B. This may allow the cover sheet 1000 to exhibit an enhanced or "spiked" compressive stress region at or near the surface, thereby facilitating failure mitigation for the cover sheet 1000 while also allowing for a suitable tensile region located over the blind recess 1004.

It will be appreciated that the foregoing is presented for purposes of illustration. The second compressive stress region 1010, or any region of the cover sheet 1000, may exhibit compressive stresses corresponding to those of the first compressive stress region 1008. For example, the second compressive stress region 1010 may also have one or more compressive stress profiles, where the compressive stress is enhanced or "spiked" at or near an external surface and tapers into a thickness of the cover sheet 1000.

With reference to FIG. 10B, a compressive stress-depth of compression diagram 1050 (also referred to herein as "diagram 1050") is depicted. The diagram 1050 depicts an amount of compressive stress exhibited by a cover sheet at corresponding depths into the material from an external surface. The diagram 1050 shows a compressive stress profile 1054 that represents the amount of compressive stress (e.g., as indicated by a compressive stress axis 1058) exhibited by the cover sheet for the corresponding depth (e.g., as indicated by a depth of compression axis 1062). The compressive stress profile 1054 may correspond to an enhanced or "spiked" compressive stress region that may be formed along, for example, the first compressive stress region 1008. However, depending on the embodiment, the compressive stress profile 1054 may correspond to other portions or regions of a cover sheet.

As described herein, the cover sheet represented by the compressive stress profile 1054 may be subjected to a multi-step strengthening process that produces a relatively higher compressive stress near an external surface of the cover sheet, as compared with a region further from the external surface. As shown in FIG. 10B, the compressive stress profile 1054 includes a first segment or portion 1066 and a second segment or portion 1070. The first portion 1066 may correspond to a region of the cover sheet that is strengthened as a result of a first chemical bath and a second chemical bath, whereas the second portion 1070 may correspond to a deeper region of the cover sheet that is strengthened as a result of only the first chemical bath. The second chemical bath may have a different concentration and/or type of equilibrium ions than the first chemical bath, and the cover sheet may be immersed in the second chemical bath for a different duration, thereby producing the different stress profiles of the compressive stress profile 1054 indicated by the first portion 1066 and the second portion 1070.

To illustrate, in an embodiment and as described above with respect to the process 600 of FIG. 6, the cover sheet may be immersed in multiple, different chemical baths in order to produce the stress profile represented by the compressive stress profile 1054. For example, the cover sheet may be immersed in a first chemical bath having a first concentration of an equilibrium ion for a first duration. As a result of this immersion of the cover sheet in the first chemical bath, the cover sheet may exhibit a compressive stress profile corresponding to the second portion 1070. This profile may extend from an external surface of the cover sheet and into an appropriate thickness.

Subsequently, the cover sheet may be immersed in a second chemical bath having a second concentration of the equilibrium ion (or a different equilibrium ion) for a second duration. In one embodiment, the second concentration of the equilibrium ion may be greater than the first concentration of the equilibrium ion, and the second duration of the second chemical bath may be less than the first duration of the first chemical bath. As a result of this immersion of the cover sheet in the second chemical bath, the cover sheet may exhibit a compressive stress profile corresponding to the first portion 1066 at least partially into a thickness of the cover sheet. At least some of the thickness of the cover sheet remains substantially unaffected by the second chemical bath (e.g., due to the different duration and/or ion concentration of the second chemical bath), and thus the cover sheet maintains the stress profile of the second portion 1070 at a thickness further from an external surface of the cover sheet than that represented by the first portion 1066. Accordingly, as a result of both the first chemical bath and the second chemical bath, the cover sheet may exhibit a stress profile corresponding to the compressive stress profile 1054, in which the cover sheet exhibits a relatively higher compressive stress in a region of the material near an external surface, as compared with a region further from the external surface.

In addition, the compressive stress having the profile 1054 depicted in FIG. 10B, may be formed over a localized region of the cover glass. In accordance with the example described above, the compressive stress with the profile 1054 may be formed over the compressive stress region 1008 of FIG. 10A. In order to achieve a localized compressive stress having a distinct chemical strength profile, one or more regions of the cover glass may be masked or covered during one or more chemically strengthening operations. In one example, a first region (corresponding to the first compressive stress region 1008) may be masked while the second compressive stress region is formed using one or more ion exchange processes. The mask or cover may then be removed from the region (that corresponds to first compressive stress region 1008) and the cover glass may be subjected to a multiple-stage ion exchange process to produce a profile similar to the profile 1054 of FIG. 10B. The second compressive stress region may be masked or covered during the subsequent multi-stage ion exchange process. In some cases, a second region (corresponding to the second compressive stress region 1010) may be masked while the first compressive stress region 1008 is formed and before forming the second compressive stress region 1010. Other combinations are possible in order to achieve the distinct compressive stress regions depicted in FIG. 10A.

It will be appreciated that the particular profiles represented by the compressive stress profile 1054 are described for purposes of illustration only. The compressive stress profile of the cover sheet, or any material or component described herein, may be at least partially based on, for example, the composition of the glass material of the cover sheet and the chemical baths, including the type and concentration of equilibrium ions. The duration of the chemical baths may also influence the compressive profile, for example, by defining an extent to which a particular compressive stress profile extends into a thickness of the cover sheet, among other considerations. In other embodiments, other techniques may be implemented to form the compressive stress region of the cover sheet, including various heat treatments, or the like.

Figure 11:
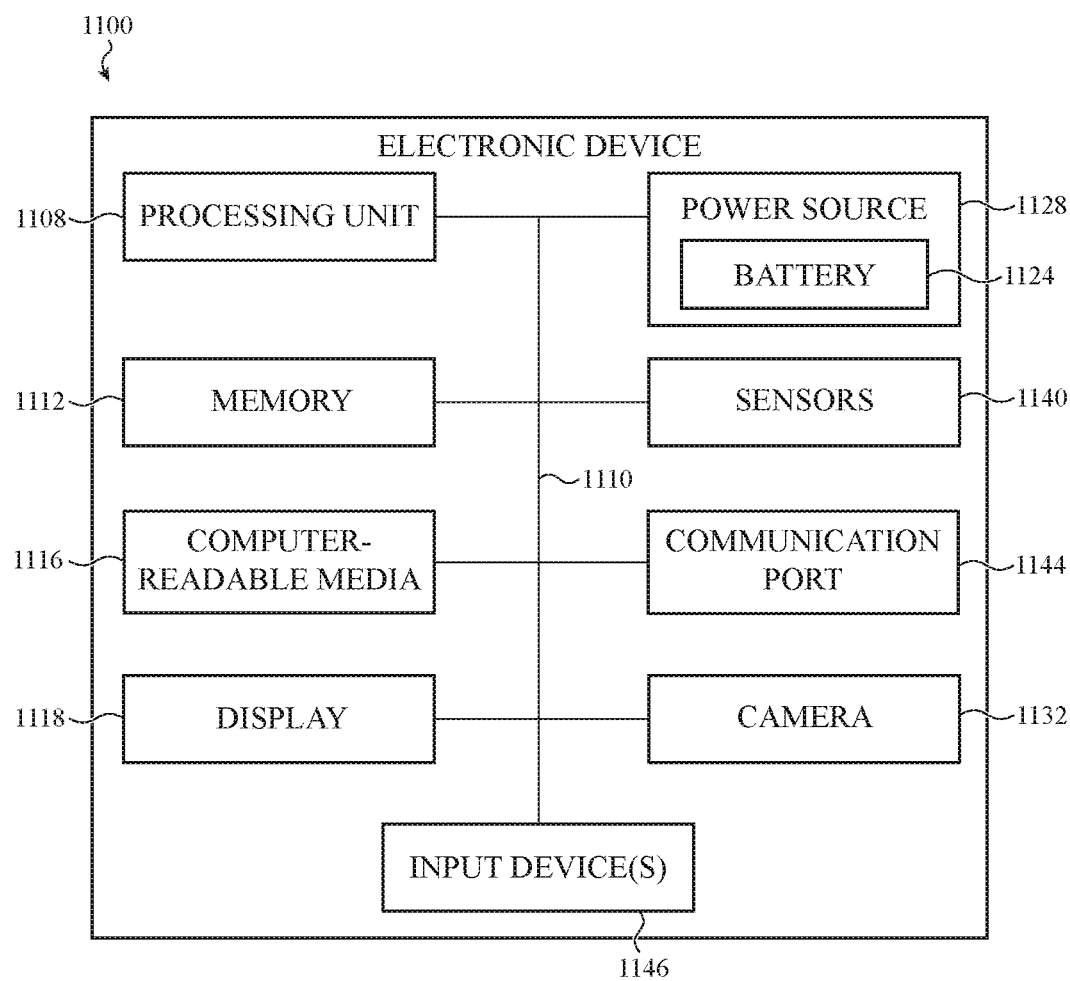
FIG. 11 depicts an example electronic device.

FIG. 11 depicts an example electronic device 1100. The electronic device 1100 may correspond to the electronic device 104 described with respect to FIGS. 1A and 1B and other figures herein. It will be appreciated, however, that the functional block diagram described herein of electronic device 1100 may include components substantially analogous to components of other electronic devices or the like described herein. In this regard, the schematic representation in FIG. 11 may correspond to the electronic device depicted in FIG. 1, described above. However, the schematic representation in FIG. 11 may also correspond to the other electronic devices or the like described herein, for example, such as electronic devices 204, 304, and 504. The electronic device 1100 may include any appropriate hardware (e.g., integrated circuits, signal processors, sensors), software (e.g., applications, operating systems, firmware), network components (e.g., network interfaces, wireless communication systems), and the like (not necessarily shown in the interest of clarity) for use in facilitating any appropriate operations disclosed herein.

As shown in FIG. 11, the electronic device 1100 may include one or more processing units or elements 1108 operatively connected to computer memory 1112 and computer-readable media 1116. The processing unit 1108 may be operatively connected to the memory 1112 and computer-readable media 1116 components via an electronic bus or bridge (e.g., such as system bus 1110). The processing unit 1108 may include one or more computer processors or microcontrollers that are configured to perform operations in response to computer-readable instructions. The processing unit 1108 may be a central processing unit electronic device. Additionally or alternatively, the processing unit 1108 may be other processors within the device including application specific integrated chips (ASIC) and other microcontroller devices.

The memory 1112 may include a variety of types of non-transitory computer-readable storage media, including, for example, read access memory (RAM), read-only memory (ROM), erasable programmable memory (e.g., EPROM and EEPROM), or flash memory. The memory 1112 is configured to store computer-readable instructions, sensor values, and other persistent software elements. Computer-readable media 1116 may also include a variety of types of non-transitory computer-readable storage media, including, for example, a hard-drive storage device, a solid-state storage device, a portable magnetic storage device, or other similar device. The computer-readable media 1116 may also be configured to store computer-readable instructions, sensor values, and other persistent software elements.

In this example, the processing unit 1108 is operable to read computer-readable instructions stored on the memory 1112 and/or computer-readable media 1116. The computer-readable instructions may adapt the processing unit 1108 to perform the operations or functions described above with respect to FIGS. 1-5. The computer-readable instructions may be provided as a computer-program product, software application, or the like.

As shown in FIG. 11, the electronic device 1100 may also include a display 1118. The display 1118 may include a liquid-crystal display (LCD), organic light emitting diode (OLED) display, light emitting diode (LED) display, or the like. If the display 1118 is an LCD, the display may also include a backlight component that can be controlled to provide variable levels of display brightness. If the display 1118 is an OLED or LED type display, the brightness of the display 1118 may be controlled by modifying the electrical signals that are provided to display elements.

The electronic device 1100 may also include a battery 1124 that is configured to provide electrical power to the components of the electronic device 1100. The battery 1124 may include one or more power storage cells that are linked together to provide an internal supply of electrical power. In this regard, the battery 1124 may be a component of a power source 1128 (e.g., including a charging system or other circuitry that supplies electrical power to components of the electronic device 1100). The battery 1124 may be operatively coupled to power management circuitry that is configured to provide appropriate voltage and power levels for individual components or groups of components within the electronic device 1100. The battery 1124, via power management circuitry, may be configured to receive power from an external source, such as an AC power outlet or interconnected computing device. The battery 1124 may store received power so that the electronic device 1100 may operate without connection to an external power source for an extended period of time, which may range from several hours to several days.

The electronic device 1100 may also include one or more sensors 1140 that may be used to detect a touch and/or force input, environmental condition, orientation, position, or some other aspect of the electronic device 1100. For example, sensors 1140 that may be included in the electronic device 1100 may include, without limitation, one or more accelerometers, gyrometers, inclinometers, or magnetometers. The sensors 1140 may also include one or more proximity sensors, such as a magnetic hall-effect sensor, inductive sensor, capacitive sensor, continuity sensor, or the like.

The sensors 1140 may also be broadly defined to include wireless positioning devices including, without limitation, global positioning system (GPS) circuitry, Wi-Fi circuitry, cellular communication circuitry, and the like. The electronic device 1100 may also include one or more optical sensors, including, without limitation, photodetectors, photosensors, image sensors, infrared sensors, or the like. In one example, the sensor 1140 may be an image sensor that detects a degree to which an ambient image matches a stored image. In another example, the sensor 1140 may include an optical imaging sensor or other imaging device that may be used to identify a user of the electronic device 1100. Specifically, the sensor 1140 may include a sensor or array of sensors that are configured to perform facial recognition to unlock the device or otherwise authenticate the identity of the user. The sensors 1140 may also include one or more acoustic elements, such as a microphone used alone or in combination with a speaker element. The sensors 1140 may also include a temperature sensor, barometer, pressure sensor, altimeter, moisture sensor, or other similar environmental sensor. The sensors 1140 may also include a light sensor that detects an ambient light condition of the electronic device 1100.

The sensor 1140, either alone or in combination, may generally be a motion sensor that is configured to estimate an orientation, position, and/or movement of the electronic device 1100. For example, the sensor 1140 may include one or more motion sensors, including, for example, one or more accelerometers, gyrometers, magnetometers, optical sensors, or the like to detect motion. The sensors 1140 may be configured to estimate one or more environmental conditions, such as temperature, air pressure, humidity, and so on. The sensors 1140, either alone or in combination with other input, may be configured to estimate a property of a supporting surface, including, without limitation, a material property, surface property, friction property, or the like.

The electronic device 1100 may also include a camera 1132 that is configured to capture a digital image or other optical data. The camera 1132 may include a charge-coupled device, complementary metal oxide (CMOS) device, or other device configured to convert light into electrical signals. The camera 1132 may also include one or more light sources, such as a strobe, flash, or other light-emitting device. As discussed above, the camera 1132 may be generally categorized as a sensor for detecting optical conditions and/or objects in the proximity of the electronic device 1100. However, the camera 1132 may also be used to create photorealistic images that may be stored in an electronic format, such as JPG, GIF, TIFF, PNG, raw image file, or other similar file types.

The electronic device 1100 may also include a communication port 1144 that is configured to transmit and/or receive signals or electrical communication from an external or separate device. The communication port 1144 may be configured to couple to an external device via a cable, adaptor, or other type of electrical connector. In some embodiments, the communication port 1144 may be used to couple the electronic device 1100 with a computing device and/or other appropriate accessories configured to send and/or receive electrical signals. The communication port 1144 may be configured to receive identifying information from an external accessory, which may be used to determine a mounting or support configuration. For example, the communication port 1144 may be used to determine that the electronic device 1100 is coupled to a mounting accessory, such as a particular type of stand or support structure.

As shown in FIG. 11, the electronic device 1100 may also include one or more input devices 1146. The input device 1146 may be or include the display region 112 (and associated elements) described herein. For example, the input device 1146 may be configured to receive an input that is used to control a function of the electronic device 1100. With regard to some of the examples described herein, the input device 1146 may include a capacitive touch sensor that is configured to detect a location of a touch along the cover. Example touch sensors include, without limitation, a mutually capacitive touch sensor and/or a self-capacitive touch sensor. The input device 1146 may also include one or more force sensors that are configured to detect or estimate an amount of force applied to the cover. Example force sensors include, without limitation, capacitive force sensors, strain-based force sensors, and/or other types of electronic force sensors. The touch and/or force sensors may be attached to or otherwise coupled to the cover. In some cases, the touch and/or force sensors are integrated into the display or another electronic element of the device 1100. Additionally, the input device 1146 may be one or more of a keyboard, mouse, pen, stylus, sound input device, touch input device, or the like.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device comprising:
an enclosure comprising:
an enclosure component defining a set of side surfaces of the enclosure; and
a cover defining an outer surface of the enclosure, the cover defining:
a recess formed at an inner surface of the cover;
a first compressive stress region formed along a portion of the outer surface of the cover that extends over the recess, the first compressive stress region having a first thickness; and
a second compressive stress region formed along a recess surface of the recess and having a second thickness that is greater than the first thickness;
a display positioned within the enclosure; and
an optical device positioned below the recess of the cover.

2. The electronic device of claim 1, wherein:
the cover is positioned over the display; and
the optical device is a camera system having a lens.

3. The electronic device of claim 2, wherein:
the recess has a curved profile that corresponds to a lens profile of the lens; and
the lens is positioned at least partially within the recess.

4. The electronic device of claim 1, wherein:
the cover defines a third compressive stress region formed along the inner surface of the cover and surrounding the recess;
the third compressive stress region has a third thickness; and
the third thickness is substantially equal to the first thickness.

5. The electronic device of claim 1, wherein:
the first compressive stress region has a first peak compressive stress;
the second compressive stress region has a second peak compressive stress; and
the first peak compressive stress is greater than the second peak compressive stress.

6. The electronic device of claim 1, wherein:
the cover is a rear cover of the enclosure; and
the optical device is a camera.

7. The electronic device of claim 1, wherein the optical device is a photodetector.

8. The electronic device of claim 1, wherein the cover comprises a glass sheet having a thickness of between 0.1 mm and 1.0 mm.

9. An electronic device comprising:
a cover formed from a glass material and defining an exterior surface, the cover defining:
a recess formed into an interior surface;
a first compressive stress region positioned along the exterior surface and extending over the recess and having first exchanged ions at a first depth; and
a second compressive stress region along a surface of the recess and having second exchanged ions at a second depth that is different than the first depth;
a display positioned below the cover; and
a camera positioned below the recess of the cover.

10. The electronic device of claim 9, wherein:
the cover is a front cover and defines a front surface of the electronic device; and
the electronic device further comprises a rear cover that defines a rear surface of the electronic device.

11. The electronic device of claim 9, wherein the second depth is greater than the first depth.

12. The electronic device of claim 9, wherein:
the cover has a third compressive stress region along a portion of the interior surface of the electronic device surrounding the recess;
the third compressive stress region has third exchanged ions at a third depth; and
the third depth is substantially equal to the first depth.

13. The electronic device of claim 9, wherein:
the camera includes a lens;
the lens is positioned at least partially within the recess; and
the recess has a curved profile that corresponds to an outer lens profile of the lens.

14. The electronic device of claim 9, wherein the first and the second exchanged ions comprise one or more of sodium, lithium, or potassium ions.

15. A portable electronic device comprising:
an enclosure comprising:
a cover defining an exterior surface of the enclosure, the cover defining:
a recess formed at an interior surface of the cover;
a first compressive stress region formed along the exterior surface of the cover and having a first thickness; and
a second compressive stress region formed along a recess surface of the recess and having a second thickness that is different than the first thickness; and
an optical device positioned below the recess of the cover.

16. The portable electronic device of claim 15, wherein:
the cover is a front cover of the enclosure;
the optical device is a camera system;
the portable electronic device further comprises a display; and
the display is positioned under the front cover.

17. The portable electronic device of claim 16, wherein:
the camera system comprises a lens having a lens profile;
the recess has a recess profile that corresponds to the lens profile; and
the lens is positioned at least partially within the recess.

18. The portable electronic device of claim 15, wherein the second thickness is greater than the first thickness.

19. The portable electronic device of claim 15, wherein:
the first compressive stress region has a first peak compressive stress;

the second compressive stress region has a second peak compressive stress; and the first peak compressive stress is greater than the second peak compressive stress.

20. The portable electronic device of claim 15, wherein:

the first compressive stress region has a first portion having a first compressive stress gradient:

the first compressive stress region has a second portion having a second compressive stress gradient; and the first compressive stress gradient is greater than the second compressive stress gradient.

\* \* \* \* \*